April 4, 1950  W. K. WASDELL  2,503,143
SHOCK ABSORBER
Filed Jan. 15, 1947
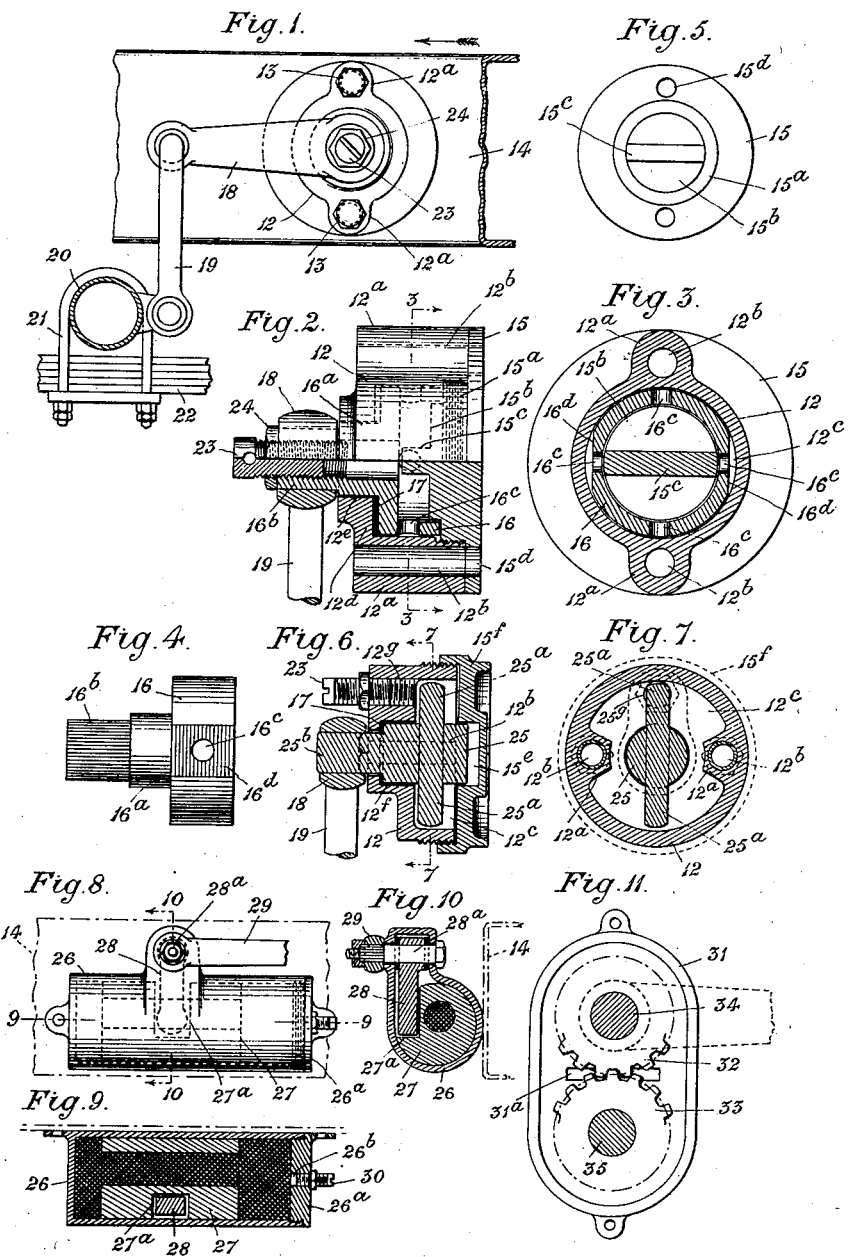

Patented Apr. 4, 1950

2,503,143

UNITED STATES PATENT OFFICE 2,503,143

SHOCK ABSORBER

William Kenneth Wasdell, Wednesbury, England

Application January 15, 1947, Serial No. 722,159
In Great Britain February 2, 1946

10 Claims. (Cl. 188—88)

My invention relates to shock absorbers, that is to say, to the devices provided in association with machines or mechanism incorporating parts or members which are, or may be, in the operation of the machine or mechanism, subjected to shock, the said devices, as is well understood operating to prevent the sudden transmission of the full effect of the shock to the main part or body of the structure of the machine or mechanism with which they are associated, and further to absorb the energy developed from the impact and ensure such a gradual recoil from the shock as will avoid or minimise the setting up of vibration or bounce in the main structure while the effect of the initial load imposed by the impact or shock is being dissipated.

Various constructions of shock absorbers have been heretofore proposed and may broadly be defined as coming within one or other of the following types or categories, namely, the coiled compression spring type, the dry friction type and the hydraulic type.

The use of the first mentioned type is attended with the defect that the recoil from the compression imposed on the spring on impact sets up considerable vibration or bounce while the energy stored by the shock is being dissipated.

Absorbers of the second type while being free from this defect and simple in construction and economical in manufacture are difficult to adjust with any degree of nicety and if the adjustment is such as is necessary to withstand and obviate a sudden transmission of the shock of a violent impact they will not function on gentle shocks and furthermore if they should inadvertently be too tightly adjusted there is a great tendency to seizure and complete failure in the functioning of the device.

Absorbers of the hydraulic type which, as is well understood, ordinarily incorporate essentially a cylindrical chamber-like body having in association therewith a member adapted for a rotary or angular motion, or a linear reciprocable motion therein, and operate through the medium of oil or other special liquid, or such liquids and air contained in the chamber-like part of the device, are very efficient in action providing they are manufactured with extreme care and accuracy, but the slightest inaccuracy in the manufacture of the parts, and even slight wear of the device in use will seriously impair their efficiency in operation and access of tiny particles of dirt will or may result in their complete failure properly to function for the purpose for which they are designed and used.

My invention has for its object to provide a shock absorber the use of which is unattended with any of the disadvantages or defects of the known types aforesaid and furthermore which is simple in design and may be manufactured without the exercise of the extreme care and accuracy which is absolutely necessary in the case of absorbers of the hydraulic type.

A shock absorber in accordance with my invention is characterised in that instead of employing oil or other special liquid such as is ordinarily used in shock absorbers of the hydraulic type for restraining and controlling the relative movements between the working or mechanical parts of the device, I employ a plastic solid substance capable of deformation under pressure and having a resistance to flow several thousand times greater than that of a liquid.

My invention further resides in shock absorbers characterised as aforesaid and incorporating parts constructed and arranged or combined as hereinafter described.

The preferred plastic solid substance or material to be used in shock absorbers in accordance with my invention is the synthetic material known in industry as a copolymer of butadiene and styrene, and under the designation "G. R. S." this abbreviation signifying "Government Rubber Styrene," which substance retains its plasticity at temperatures well below zero and does not soften appreciably at summer heat, or temperatures approximating 200 degrees Fahrenheit, but other plastic solid substances having like physical properties, as for example, uncured or unvulcanised natural rubber or devulcanised rubber or alternatively a synthetic rubber coming in the category generically known as "elastomers" as for example chloroprenes, butadiene acrylonitrile copolymers, isobutene diolefin copolymers, silicone rubbers and organic polysulphides or thioplasts, may be employed.

If uncured or devulcanised natural rubber is employed it must be plasticised when the devices are to be used in climates where the temperatures may drop to near freezing point.

The plastic solid substance employed is introduced preferably under pressure into a hollow cylindrical or chamber-like part constituting the main body of the shock absorber so as practically to fill the spaces, clearances or cavities therein which are unoccupied by a member or members located in the said cylindrical or chamber-like body and adapted to partake of a rotary or angular motion, or a reciprocable linear motion relative thereto, and the relative motion between the said parts, which motion is induced when the machine or mechanism with which the absorber is associated is subjected to shock, operates to effect a flow of the plastic solid substance through the clearances between the relatively moving parts and/or through a bore or bores or other passage provided in the rotatable or reciprocable member or members and designed to permit a flow of the plastic solid substance from one to another part of the interior of the cylinder or chamber.

It will be appreciated that in view of the very high inherent resistance to flow and deformation in the plastic solid substance employed in accordance with my invention, the clearances between the relatively moving parts, other than the parts which constitute bearings, and also the size of the hole or bore, or holes or bores which are, or may be, provided for permitting a flow of the substance through the member or members located in the interior of the cylinder or chamber, may be many thousand times greater than in shock absorbers of the hydraulic type wherein oil or other freely flowing and readily deformable liquid is employed, and consequently the necessity for the extreme care and accuracy and expert workmanship called for in the manufacture of the ordinary hydraulic shock absorbers is obviated and the production of the devices is greatly expedited and economised.

Furthermore the effective operation of shock absorbers in accordance with my invention will not be impaired by access of fine particles of dust into the interior of the chamber or cylinder of the device.

Shock absorbers in accordance with my invention may be designed for use in association with the wheels of motor road vehicles, motor cycle front forks, the under carriages of aeroplanes and in many other machines or mechanisms where shock absorbers are or may be employed, and the design or construction of the mechanical or working parts thereof is susceptible of considerable variation exemplifications of which will now be described with reference to the accompanying drawings, wherein—

Figure 1 represents in side elevation a convenient and preferred embodiment of the invention in its application to a shock absorber of the type incorporating a member adapted for a rotary or angular motion relative to the body of the device and designed for use in association with the spring suspensions of the wheels of road vehicles, fragmentary portions only of the frame or chassis of the vehicle whereon the shock absorber is mounted and the contiguous laminated spring carrying the wheel axle, seen in section, with which the shock absorber is associated and interconnected by links as shown being represented in the said figure.

Figure 2 represents the shock absorber, detached from the chassis, half in elevation and half in section viewed in the direction of the arrow in Figure 1, portions of the links whereby it is operatively connected with the wheel axle being shown in the said figure.

Figure 3 is a section on the plane indicated by the dotted line 3—3, Figure 2.

Figure 4 represents in side elevation the rotary member or element incorporated in this construction, detached.

Figure 5 is an inner face view of a detachable portion, hereinafter more particularly described, of the body of the device, the said figure being drawn to the same scale as Figure 1, while Figures 2, 3 and 4 are drawn to a larger scale.

Figure 6 represents, mainly in transverse section on a vertical plane, a shock absorber of the same type as that represented in Figures 1 to 5, and having the parts thereof modified in construction as hereinafter described.

Figure 7 is a section of this modified construction on the plane indicated by the dotted line 7—7, in Figure 6.

Figure 8 illustrates a convenient embodiment of the invention as applied to a shock absorber of the type incorporating a member adapted for a reciprocable linear motion in the tubular body or medium containing chamber of the device.

Figure 9 is a sectional plan of the same on the plane 9—9, Figure 8.

Figure 10 is a transverse section on the plane 10—10, Figure 8, and

Figure 11 illustrates a construction, hereinafter more particularly described, wherein two intermeshed toothed wheels are provided in the interior of the body or chamber containing the solid plastic medium, the said wheels co-acting in the operation of the device to effect the displacement of the medium from one part to another of the chamber.

Referring first to the construction illustrated in Figures 1 to 5, both inclusive, the reference 12 denotes the main part or body of the device, the said body being substantially cylindrical in formation and having on diametrically opposite sides of its exterior periphery a transversely disposed rib or projection 12$^a$ provided with a bore 12$^b$ the said bores accommodating and permitting the passage therethrough of bolts 13 whereby the said chamber-like body may, with the parts associated therewith, be fixed to the chassis 14, as shown, in Figure 1.

The cylindrical body 12 has concentrically disposed therein a chamber 12$^c$ which extends through the body from the rear end to near the front end thereof at which end it terminates on a flange-like part 12$^d$ the internal periphery of which is of a diameter proper to constitute a bearing 12$^e$ for a portion of the rotary member hereinafter described associated with the body of the device.

The chamber 12$^c$ is furnished at the rearward end thereof with an internal screw thread to adapt it for the screw engagement therewith of a closure member 15, shown detached in Figure 5, the inner face of which is formed with two concentrically disposed circular projections marked 15$^a$, 15$^b$ of different diameters, the projection 15$^a$ being of the diameter proper and externally screwed on its periphery for effecting the said screw connection with the body 12.

The projection 15$^b$ of smaller diameter is formed with a rib 15$^c$ which extends diametrically across the face thereof and serves the purpose hereinafter referred to.

The closure member has diametrically disposed holes 15$^d$ therein which when the said member is screwed to the body are brought into coincidence with the bores 12$^b$ and through which the fixing bolts 13 are passed in attaching the device to the chassis 14.

Associated with the main part or body described is a rotor which is shown separately in Figure 4, the said rotor being of tubular formation as is best seen in the sectional part of Figure 2.

The portion of the rotor denoted by the reference 16 has the formation of an annulus of an external diameter practically equal to the diameter of the chamber 12c in the body in which chamber the said portion 16 of the rotor is located when the parts are properly assembled, and an internal diameter such as to permit the part 15b of the closure member 15 and the diametrical rib 15c thereon to enter thereinto when the closure member is screwed on the body, the annulus 16 of the rotor and the rib 15c on the closure plate co-operating, when the device is in operation, to effect the deformation and displacement of the solid plastic medium in the chamber thereby cushioning the impact of shock and absorbing and gradually damping vibration resulting therefrom.

The portion 16 of the rotor has an axial length somewhat less than that of the axial length of the part of the chamber 12c lying between the face of the projection 15a of the closure member and the inner face of the flange-like part 12d aforesaid at the front end of the body 12 so that a sufficient space is left between the inner face of the flange 12d and the presented face of the part 16 of the rotor to accommodate a washer 17 made of fibre, graphite or other suitable and hard wearing material, the said washer 17 acting effectively to prevent leakage of the solid plastic medium employed in the device in accordance with the invention.

The annular part 16 of the rotor is furnished with a plurality of holes in the wall thereof, for example four holes as shown and marked 16c in the drawings, and flats 16d are formed at preferably two diametrically opposite sides of the wall, two of the holes 16c being so disposed as to pass through the flattened parts of the wall.

The spaces formed between the said flattened sides 16d of the rotor and the periphery of the chamber 12c of the body co-operate with the holes 16c in the rotor, when the rotor is oscillated under the impact of shocks, to permit the deformation and displacement of the plastic medium with which the cavities and clearances in the chamber are completely filled, from one part or side of the chamber to another.

The portion 16a of the rotor adjoining the annulus 16 occupies and has a diameter proper to turn freely in the bearing formed by the inner periphery of the flange 12d of the body, the said part 16a having a tight fit in the central aperture of the fibre washer which serves to keep the rotor truly axial while the solid plastic medium is being introduced into the body.

The rotor terminates at its outer end in a part 16b which projects from the face of the body and is splined for the fixing thereon of a lever-like arm 18 which has connection through a link 19 with the wheel axle 20 secured by the usual inverted U bolts 21, or otherwise connected to the laminated suspension spring 22, or other spring suspension.

The solid plastic medium is introduced into the cavities to be filled thereby through the axial bore of the rotor and the said bore which is provided with an internal screw thread in the outer part thereof is closed by a screw plug 23 when the filling operation is complete.

The extent to which the screw plug 23 is screwed into the axial bore of the rotor may be utilised to impose variable degrees of pressure on the medium and a lock nut 24 may be associated with the said screw plug for fixing it in its adjusted position.

In the embodiment of my invention represented in Figures 6 and 7 of the drawings the rotary member associated with the annular body 12 of the shock absorber is of the paddle type and comprises a cylindrical portion 25 carrying a pair of arms or vanes 25a which project radially one from each side thereof so as to extend diametrically in the chamber 12c, their outer ends terminating in more or less close proximity to the inner periphery of the said chamber.

This rotor is disposed axially in the chamber 12c, the front portion of the part 25, which has an extension 25b thereon of reduced diameter, which projects through and from the front face of the body, being located and turning freely in a bearing provided by a recess 12f in the body 12, the rear end of the said part 25 engaging in a recess 15e in the member 15f whereby the rear side of the chamber 12c of the body 12 is closed.

A washer or sealing ring 17 of fibre or other hard wearing material is, as in the first described arrangement, inserted between the front end of the part 25 of the rotor and the flange-like part at the aperture in the front face of the body through which the extension 25b of the rotor projects.

The projecting portion of the exension 25b of the rotor is splined or otherwise adapted for the attachment thereto of the operating arm or lever.

According to this embodiment the introduction of the plastic medium into the chamber of the body is effected through a bore 12g provided in the body instead of in the rotor, a plug 23 being furnished for closing the bore.

Further, according to this embodiment the bores 12b through which the fixing bolts are passed may be formed in ribs or thickened parts 12a disposed in the interior of the annular chamber instead of exterior thereto.

A convenient embodiment of my invention as applied to a construction of shock absorber wherein the member provided in association with the cylindrical or chamber-like body is adapted to perform reciprocable linear motions in the operation of the device is illustrated in Figures 8, 9 and 10 of the drawings.

The said embodiment incorporates a tubular body 26 adapted, when the devices are designed for use in conjunction with wheel suspensions, to be mounted on the chassis of the vehicle in appropriate proximity to the wheel with which it is associated, the said cylindrical body 26 having in the interior thereof a block 27 of somewhat shorter length than the cylinder and of a diameter proper to fit and slide therein. The said block 27 has a bore or passage of comparatively large cross sectional area extending longitudinally therethrough and the block is adapted to be moved axially in the cylinder, when any shock is imposed on the wheel of the vehicle, by the engagement with a slot or cut-away part 27a in the block 27 of a crank-like part 28 carried by a shaft or spindle 28a mounted in bearings in an appropriately formed extension on the cylinder 26, the projecting part of the spindle 28a being splined or otherwise adapted for connection with an operating lever 29 the other end of which has suitable connection with the axle of the wheel.

The parts of the cylinder unoccupied by the slidable block 27 and also the passage through the said block are, as indicated by the heavy cross hatching in Figure 9, completely filled with the plastic solid substance employed in accordance with the invention.

Both ends, or as shown in the drawings one end only, denoted by the reference 26a has a detachable connection with the cylindrical body 26 and the solid plastic may be introduced into the cylinder through a tapped bore 26ᵇ in the said end and adapted to be closed by a screw plug 30.

According to a further exemplification of the invention illustrated by Figure 11 of the drawings the chamber-like body denoted by the reference 31 provided for containing the plastic solid substance may be formed with parallel sides and semi-cylindrical ends and be provided in the interior thereof with a pair of toothed gear wheels 32, 33 mounted on axles 34, 35 turning in bearings in the opposite sides of the chamber which is adapted to be fixed to the chassis.

The chamber-like body is shown in the figure with the front side removed to disclose the gearing in the chamber.

The gear wheels mesh at the middle section of the chamber and the axle 34 of one of the said wheels projects from one side of the casing and has operative connection with one end of an arm appropriately attached to the wheel axle and which is rocked when the wheel axle is subjected to shock.

The parts of the interior of the chamber unoccupied by the gear wheels are filled with the plastic solid substance and in operation on shock the teeth of the wheels co-act to force the plastic between them and cause it to flow from one part to another in the chamber or casing.

A passage 31ᵃ is, or may be, cut in the inner face of one or both of the sides of the casing which lie parallel with the wheels 32, 33 to allow the plastic substance displaced by the flow imparted thereto to leak back again.

Suitable sealing means such as the washers 17 aforesaid may be incorporated in the devices at all parts where necessary or desirable for preventing leakage of the plastic solid substance and also for obviating the ingress of water or dirt to the bearings.

In order to avoid confusion or obscurity of parts in the figures of the drawings the plastic solid substance which in accordance with the invention is packed into the cylindrical or chamber-like bodies of the devices so as completely to fill the clearances or spaces or cavities therein which are unoccupied by mechanical parts, is not indicated in any of the figures with the exception of Figure 9.

Although my invention has been above described with reference to shock absorbers provided in conjunction with the laminated spring suspensions of vehicle wheels it will be understood that it is applicable to shock absorbers of analogous types used in conjunction with other constructions of spring suspensions for the wheels of vehicles and in other machines or mechanisms wherein such devices are, or may be, provided for the purpose of preventing or minimising the undesirable effects arising from the transmission of shock between correlated parts thereof.

I claim:

1. A shock absorber comprising a body element having a chamber therein, a cooperating element movable relatively to the body element, a member on one of said elements dividing said chamber into spaces at opposite sides of said member, restricted means of communication being provided between said spaces, and a solid plastic mass of an unvulcanized elastomer completely filling the spaces in said chamber and said means of communication, said mass having the physical property of being highly resistant to deformation but deformable under pressure imposed thereon by relative movement between said elements at temperatures substantially below freezing point and of retaining said property at temperatures approximating 200 degrees Fahrenheit.

2. A shock absorber as defined in claim 1, wherein said mass has a viscosity of the order of an unvulcanized copolymer of butadiene and styrene.

3. A shock absorber as defined in claim 1, wherein said mass completely fills said chamber under a pressure above atmospheric pressure.

4. A shock absorber as defined in claim 1, including means for variably imposing pressure on said mass completely filling said chamber.

5. A shock absorber comprising a body element having a chamber therein, a rotor element mounted for rotation relatively to the body element, a member on one of said elements extending radially relatively to the axis of the rotor element and dividing said chamber into spaces at opposite sides of said member, restricted means of communication being provided between said spaces, and a solid plastic mass of an unvulcanized elastomer completely filling said spaces and said means of communication, said mass having the property of being highly resistant to deformation but deformable under pressure imposed thereon by relative angular movement between said elements.

6. A shock absorber as defined in claim 5, wherein said chamber is provided with an opening communicating therewith, and a screw-plug operative in said opening for imposing pressure upon said mass filling said chamber.

7. A shock absorber comprising a body element having a cylindrical chamber therein, a rotor element mounted to rotate relatively to the body element, a member on one of said elements extending diametrically in said chamber and dividing the latter into spaces at opposite sides of said member, restricted means of communication being provided between said spaces, and a solid plastic mass of an unvulcanized elastomer completely filling said spaces and said means of communication and having the property of being highly resistant to deformation but deformable under pressure imposed thereon by relative rotation between said elements.

8. A shock absorber comprising a body having a cylindrical chamber therein, a rotor mounted for rotation relatively to the body and having an annulus contained in said chamber and provided with holes in its periphery, a member fixed to the body and extending diametrically of the chamber and dividing the latter into spaces at opposite sides of said member, said holes providing restricted means of communication between the spaces at the opposite sides of said member, and a solid plastic substance completely filling said chamber and holes, said substance being deformable under pressure imposed thereon by relative rotation between the rotor and body to thereby restrain relative rotation therebetween.

9. A shock absorber as defined in claim 8, wherein said rotor is provided with a bore communicating with said chamber, and means operative axially in said bore for imposing pressure on said substance filling said chamber.

10. A shock absorber as defined in claim 8, wherein said rotor is provided with a bore which is screw-threaded at its outer portion and communicates at its inner end with said chamber, and a plug threaded in said bore and operative to impose pressure on said substance filling said chamber.

WILLIAM KENNETH WASDELL.

REFERENCES CITED

The following references are of record in the file of this patent:

UNITED STATES PATENTS

| Number | Name | Date |
|---|---|---|
| 1,114,691 | Herz | Oct. 20, 1914 |
| 1,461,091 | Henley | July 10, 1923 |
| 2,460,116 | Bazley | Jan. 25, 1949 |

OTHER REFERENCES

Synthetic Rubber Today, article in Scientific America, September 1943, pp. 115 to 117, Art Rubber Digest, Div. 15.

Uses and Processing of Silicone Rubber, article in Modern Plastics, December 1946, pp. 102 to 104, Art Rubber Digest, Div. 15.